US011499779B2

(12) United States Patent
Toniolo et al.

(10) Patent No.: US 11,499,779 B2
(45) Date of Patent: Nov. 15, 2022

(54) SYSTEMS AND METHODS FOR GRAPHITE ELECTRODE IDENTIFICATION AND MONITORING

(71) Applicant: GRAFTECH INTERNATIONAL HOLDINGS INC., Brooklyn Heights, OH (US)

(72) Inventors: Pablo Toniolo, Avon, OH (US); Ronald Gerhan, Vermilion, OH (US); Ryan Paul, Lakewood, OH (US); James Merzlak, Medina, OH (US); Frank Andrew Messineo, Jr., Ridgway, PA (US)

(73) Assignee: GrafTech International Holdings Inc., Brooklyn Heights, OH (US)

( * ) Notice: Subject to any disclaimer, the term of this patent is extended or adjusted under 35 U.S.C. 154(b) by 32 days.

(21) Appl. No.: 16/641,781

(22) PCT Filed: Aug. 23, 2018

(86) PCT No.: PCT/US2018/047697
§ 371 (c)(1),
(2) Date: Feb. 25, 2020

(87) PCT Pub. No.: WO2019/040715
PCT Pub. Date: Feb. 28, 2019

(65) Prior Publication Data
US 2020/0355436 A1    Nov. 12, 2020

Related U.S. Application Data

(60) Provisional application No. 62/550,242, filed on Aug. 25, 2017.

(51) Int. Cl.
*F27B 3/28*    (2006.01)
*F27B 3/08*    (2006.01)
(Continued)

(52) U.S. Cl.
CPC ............ *F27B 3/28* (2013.01); *F27B 3/085* (2013.01); *G01D 4/004* (2013.01);
(Continued)

(58) Field of Classification Search
CPC ........... F27B 3/28; F27B 3/085; G01D 4/004; G06K 7/10009; G06K 19/0723; G06Q 50/06; H05B 7/06
(Continued)

(56) References Cited

U.S. PATENT DOCUMENTS 4,162,368 A    7/1979   Brazier
6,804,582 B1   10/2004   Gerhan
(Continued)

FOREIGN PATENT DOCUMENTS

WO      02/28084      4/2002

OTHER PUBLICATIONS

EP, European Patent Office, Extended European Search Report and Opinion, European Patent Application Serial No. 18848027.1, 7 pages (Apr. 14, 2021).
(Continued)

*Primary Examiner* — Michael G Lee
*Assistant Examiner* — David Tardif
(74) *Attorney, Agent, or Firm* — Thompson Hine LLP

(57) ABSTRACT

A system and method is disclosed for monitoring graphite electrodes for use in an electric arc furnace includes receiving an electrode identifiers from a radio frequency identification (RFID) tag reader configured to interrogate RFID tags in the vicinity of an electric arc furnace (EAF), wherein the RFID tags are attached to electrodes. The electrode identifier is associated with EAF data collected from the EAF and the association is stored in a memory. The association is used for generating current and past operating parameters of the electric arc furnace for specific electrodes. Data for each specific electrode used in the EAF can also be collected for determining performance parameters for specific electrodes.

34 Claims, 2 Drawing Sheets

(51) Int. Cl.
*G06K 19/07* (2006.01)
*G01D 4/00* (2006.01)
*G06K 7/10* (2006.01)
*G06Q 50/06* (2012.01)
*H05B 7/06* (2006.01)

(52) U.S. Cl.
CPC ..... G06K 7/10009 (2013.01); G06K 19/0723 (2013.01); *G06Q 50/06* (2013.01); *H05B 7/06* (2013.01)

(58) Field of Classification Search
USPC .......................................................... 235/492
See application file for complete search history.

(56) References Cited

U.S. PATENT DOCUMENTS

| | | | | |
|---|---|---|---|---|
| 7,386,369 | B1* | 6/2008 | Gerhan | ................... H05B 7/06 373/88 |
| 2004/0162586 | A1 | 8/2004 | Covey et al. | |
| 2006/0267776 | A1* | 11/2006 | Taki | ...................... B31D 1/021 156/64 |
| 2011/0012736 | A1* | 1/2011 | Potyrailo | ........... G06K 19/0717 340/572.1 |
| 2012/0140789 | A1 | 6/2012 | Colburn et al. | |
| 2013/0148686 | A1 | 6/2013 | Coleman et al. | |
| 2015/0001297 | A1 | 1/2015 | Sun et al. | |
| 2015/0204808 | A1 | 7/2015 | Lugo-Flores et al. | |
| 2016/0280608 | A1* | 9/2016 | Foret | ........................ H05H 1/42 |

OTHER PUBLICATIONS

PCT, U.S. Patent and Trademark Office (ISA/US), International Search Report, International Application No. PCT/US2018/047697, 4 pages, dated Dec. 14, 2018.

PCT, U.S. Patent and Trademark Office (ISA/US), Written Opinion of the International Searching Authority, International Application No. PCT/US2018/047697, 9 pages, dated Dec. 14, 2018.

EP, European Patent Office, Communication pursuant to Article 94(3) EPC, European Patent Application Serial No. 18848027.1, 4 pages (dated Aug. 16, 2022).

BR, Brazilian Patent and Trademark Office, Office Action and Search Report, Brazilian Patent Application Serial No. BR112020003691-9, 7 pages (dated Jul. 21, 2022).

\* cited by examiner

SYSTEMS AND METHODS FOR GRAPHITE ELECTRODE IDENTIFICATION AND MONITORING

CROSS-REFERENCE TO RELATED APPLICATIONS

This Application is a national stage filing of PCT Application No. PCT/US2018/047697 (Publication No. WO 2019/040715), filed on Aug. 23, 2018, which claims priority to U.S. Provisional Application No. 62/550,242, filed on Aug. 25, 2017. The entire contents of both applications are incorporated by reference herein.

BACKGROUND

The present invention relates to graphite electrodes for electric arc furnaces (EAFs) and more specifically, to an electrode identification and monitoring system and method that automatically provides electrode identification data for use in improving the operation of the electric arc furnace.

An electric arc furnace heats a charge of steel scrap material by means of an electric arc. The charged material is melted by direct exposure to the electric arc and subsequent passing of the electric current therethrough. An electric arc furnace generally includes a large vessel, covered with a retractable roof. The roof includes holes that allow one (in a DC furnace) or more commonly three (in an AC furnace) graphite electrode columns to enter the furnace. A movable electrode support structure holds and moves the electrode columns to maintain proximity to the scrap material. Power for the electrode columns is provided by a transformer, typically located near the furnace. The electrode columns each include a plurality of individual electrodes that are secured together with threaded connections at each end. The electrodes are slowly consumed as part of the steel making process and thus, new electrodes must be added to each column periodically.

During the melting cycle, referred to as a "heat", a power regulating system attempts to maintain approximately constant current, power, impedance, admittance, resistance or some combination of these inputs during the melting of the charge. The regulator therefore seeks to control the distance between the electrode tip and the burden (solid charge material or molten metal) given the adopted regulation philosophy. This is made more difficult when scrap moves under the electrodes as it melts. Input is regulated, in part, by employing an electrode positioning system which automatically raises and lowers the electrode columns. In most cases, positioning systems may employ hydraulic cylinders to provide the moving force. Once relatively steady state conditions are reached in the furnace, (i.e. the scrap is substantially melted) another bucket of scrap may be charged into the furnace and melted down. After the first or optional second charge is completely melted, various other operations take place such as, refining, monitoring chemical compositions, and finally superheating the melt in preparation for tapping.

The graphite electrodes' chemical composition can be varied somewhat by the manufacturer to optimize performance characteristics. Determining electrode performance in the EAF requires knowledge of which specific electrodes are being used in each heat. It is desirable to obtain this information in an accurate and automated manner.

BRIEF DESCRIPTION OF THE DRAWINGS

The structure and certain embodiments of the invention can best be understood by reference to the accompanying drawings, in which.

DETAILED DESCRIPTION

Graphite electrodes are a necessary consumable in an electric arc furnace and are the only known material suitable to withstand the extremely harsh operating environment of the electric furnace steelmaking operation. Accordingly, steel manufacturers are highly cognizant of the cost and performance of the graphite electrodes being consumed in the furnace. The systems and methods disclosed herein for monitoring electrodes used in an electric arc furnace can be used to monitor and improve the performance of graphite electrodes.

Figure 1:
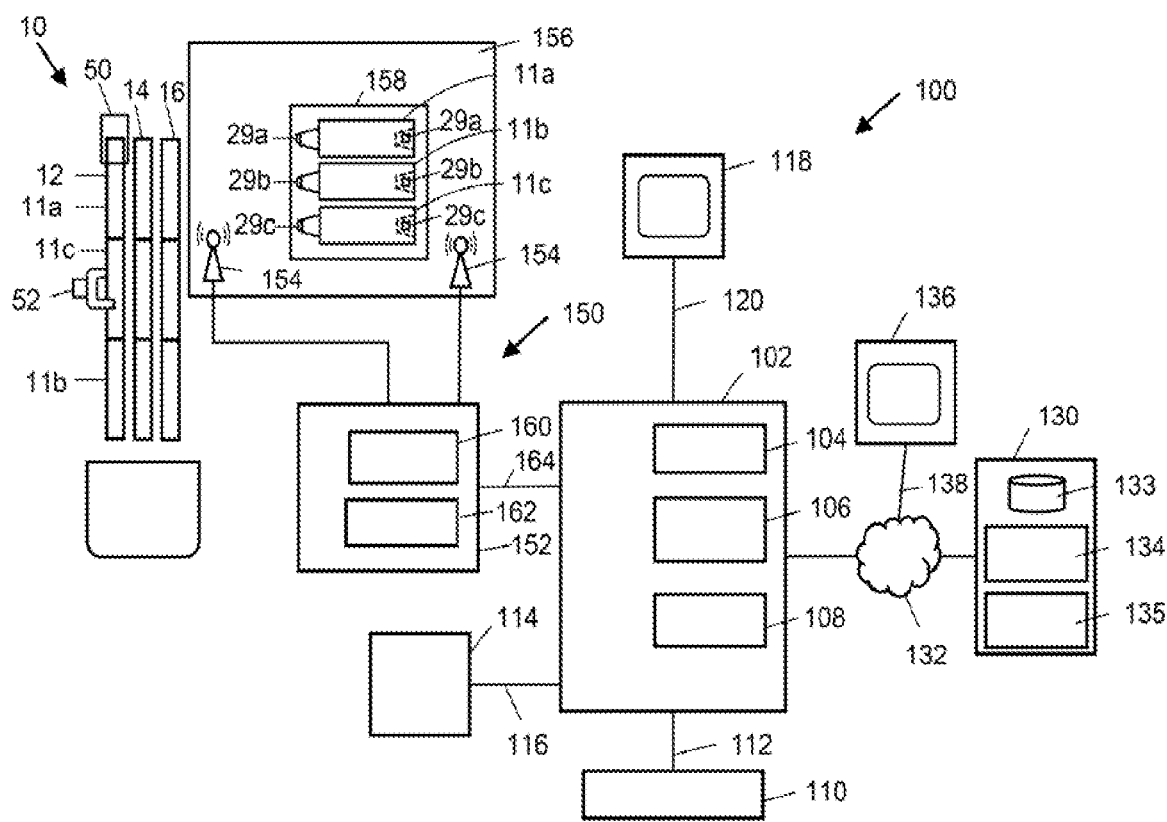
FIG. 1 is a block diagram illustrating a system for detecting and monitoring a graphite electrode in the vicinity of an electric arc furnace, in accordance with the present invention.

Referring now to FIG. 1, a system for monitoring electrodes used in an electric arc furnace (EAF) constructed in accordance with the present invention is shown generally by reference numeral 100. The electrode monitoring system 100 includes a monitor 102. The monitor 102 can be an electrode monitor for collecting and processing data related to electrode identification and monitoring. In other examples, the monitor 102 can be a furnace monitor 102 for collecting and processing operational data for an EAF shown generally at 10. The EAF 10 can be an AC furnace, of a 3 phase design having an electrode column for each phase, or a DC furnace consisting of one or two electrode columns. A 3 phase EAF AC furnace is described herein by way of example. The EAF 10 uses electrodes, referred to generally at 11, to melt metals and other ingredients to form steel. The electrodes 11 are joined together end-to-end to form electrode columns 12, 14, 16, with each column powered by a separate electrical phase (in 3 phase AC furnaces). DC furnaces employ a single column (i.e. cathode), or two columns (i.e. anode and cathode). The heat needed to melt metals is generated by passing current through the one or more of the electrode columns 12, 14, 16 and forming an arc between the electrode column(s) and the metal in the furnace. Electrical currents in excess of 100,000 amperes are often used. The resulting high temperature melts the metals and other ingredients in an heating operation known as a "heat", further details of which are provided below.

The furnace monitor 102 is a computer control device, such as for example a modular controller, configured to receive a wide range of data regarding of the operation of the furnace 10. The furnace monitor 102 is typically a local device, disposed onsite at the site of the EAF 10. The electrode monitor and/or furnace monitor 102 includes a processor 104, memory 106 and an input/output module 108 which are used for monitoring the electrodes 12 used in the furnace 10, as described in further detail below.

An electrical meter 110 is operatively connected to the furnace monitor 102, such as by an Ethernet connection 112, for collecting electrical data pertaining to the furnace 10. The electrical meter 110 can be an power meter, an ion meter, or other furnace monitoring device. The furnace monitor 102 collects the furnace electrical data from the electrical meter 110 on a periodic basis. The collected data includes voltage and current measurements generated from the current and voltage transformers connected to each phase of the primary electrical circuit. The furnace electrical data is an example of EAF data which is associated with specific electrodes using electrode identifiers as described in further detail below.

The system 100 further includes one or more programmable logic controllers (PLCs), only one of which is shown for simplicity at 114. The one or more PLCs 114 are operatively connected to the furnace monitor 102 via the EAF owner's existing PLC network 116, examples of which can include an Ethernet connection and/or a serial connection such as for example an RS242, RS422 or RS485 connection. The one or more PLCs 114 provide process information about each "heat," to the furnace monitor 102. The process data for each heat includes times, oxygen and natural gas consumption, process weights, temperatures and end-of-heat signals. The process data is another example of EAF data which is associated with electrode identifiers as described in further detail below.

A furnace monitor viewing system 118 is connected to the furnace monitor 102 via a wired or wireless local connection 120 for displaying the EAF data to users located onsite, i.e. at the EAF facility. The furnace monitor viewer system 118 can display the EAF data in real time during the operation of the EAF to assist furnace operators during furnace operation.

In at least one example, the system 100 can also include a remote server 130 located at a different location than the onsite furnace monitor 102 and connected to the furnace monitor via the Internet 132. The remote server 130 includes a database 133 for storing the furnace data and processed data received from the furnace monitor 102. The remote server 130 also includes a processor 134 configured to further process the EAF data in association with electrode identifiers identifying specific electrodes to allow a user to view current and past operating parameters of the electric arc furnace 10 including operating trends, historical trends, statistical tables and graphical representations to better assist the viewer in evaluating the operation of the furnace 10 at it relates to specific electrodes, as described in further detail below. The remote server can include an Internet portal 135 for allowing authorized users to access the data described herein via the Internet. The remote server 130 can be a central server connected furnace monitors at several different EAF facilities. Alternatively, the remote server 130 can be dedicated to a single EAF facility.

In at least one example, the system 100 can also include a remote viewer 136 operatively connected to the furnace monitor 102, the remote server 130, or both via an internet connection 132. The remote viewer 136 enables offsite technicians to view the furnace data and the current and past operating parameters described above.

The system 100 also includes an electrode detection and identification device 150 which detects an electrode and provides an electrode identifier to the furnace monitor. In at least one example, the device 150 includes a Radio Frequency Identification (RFID) tag reader 152, also known as an interrogator, or reader, connected to one or more antennas 154. The antennas 154 are disposed at a location 156, such as the vicinity of the EAF furnace 10, for capturing signals from RFID tags, referred to generally at 29, which are attached to electrodes 11 that are located in that vicinity 156.

Figure 2A:
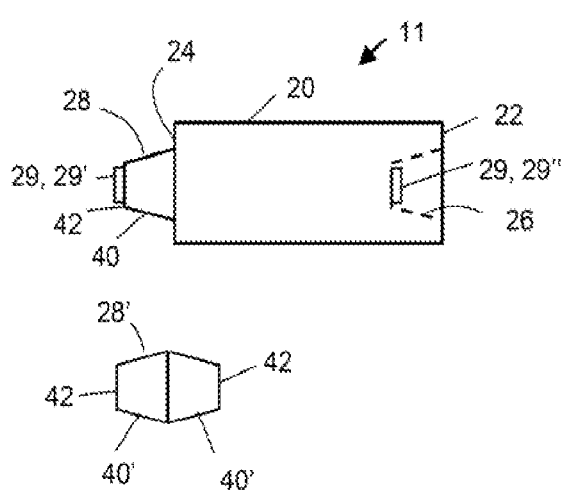
FIG. 2a illustrates an electrode having at least one RFID tag attached for detection and monitoring by the system of FIG. 1.
Figure 2B:
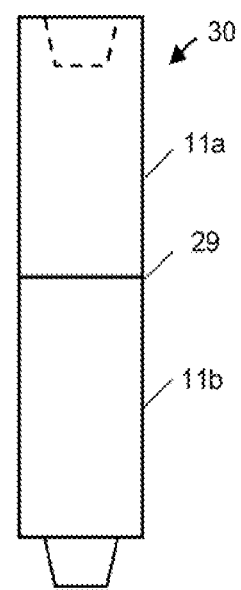
FIG. 2b illustrates an electrode column having plurality of electrodes connected together for use in the electric arc furnace of FIG. 1.

Referring now to FIGS. 2a & 2b, an example graphite electrode discussed herein is shown generally at 11. The graphite electrode 11 includes an electrode body 20 formed of graphite. The body 20 is generally cylindrical having oppositely disposed ends 22 and 24 which include threaded connectors. The threaded connectors can include a threaded socket 26 formed in one of the ends, 22, 24 and a threaded pin 28 formed at the other of the ends. In one example the threaded pin 28 is formed integrally with the body 20, such as by machining. The pin 28 includes a truncated conical threaded portion 40 extending from the body end 24 and terminating in an end face 42. In another example, the pin 28' includes oppositely disposed truncated conical threaded portions 40' each terminating in oppositely disposed end faces 42. In this example the pin 28' is threaded into a socket 26 of an electrode which has a socket at each end 22 and 24 to form a pin disposed at one of the ends 22, 24.

The threaded pin 28, 28' and threaded socket 26 are of matching size and shape so that the threaded pin 28 of one electrode 11a can be received in the threaded socket 26 of another electrode 11b to join the electrodes together at a joint 29 to form an electrode column shown generally at 30 in FIG. 2b. As discussed above, when in use in the EAF, a separate electrode column 30 is used for each phase of a multi-phase furnace. Thus, for example, the 3 phase AC EAF 10 shown in FIG. 1 utilizes 3 electrode columns 12, 14, 16, each corresponding to a different electrical phase of the 3 phase EAF.

The electrode 11 includes at least one tag 29 attached to the body, wherein the tag creates a non-line-of-sight signal representing an electrode identifier. The tag 29 can be an RFID tag. The RFID tag 29 can be a passive tag having a non-powered signal generator configured to transmit a signal to the antenna 154 described above. Alternatively, the RFID tag 29 can be an active tag having a powered signal generator configured to transmit a signal to the antenna 154. In each instance, the signal corresponds to an electrode identifier. The electrode identifier uniquely identifies a single, specific electrode. The electrode identifier can include electrode data corresponding to the specific electrode which it identifies. Examples of this electrode data can include some or all of, but is not limited to, an identifier identifying the location of the plant at which the electrode was machined, an identifier identifying the line on which the electrode was machined, a weight of the electrode, a date the electrode was machined, a sequential number for identifying a specific electrode within a sequence of numbers identifying a set of electrodes. An electrode identifier including this combination of electrode data can be referred to as a Base of Socket identifier. The electrode identifier can also include batch identification information identifying the batch from which the graphite electrode was formed. The electrode identifier can include an EAF owner-specific electrode identifier, also known as a stencil number, for identifying the specific electrode using criteria provided by the EAF owner.

The electrode 11 can include one RFID tag 29 attached to the body 20. Examples of this arrangement include the one tag attached to the pin 28, or to a different location at the end 24, or to the socket 26 or to a different location at the end 22, or to body 20 disposed between the ends 22, 24. The electrode 11 can include two RFID tags 29. In one example the two tags 29 are configured to transmit the same signal to the antenna 154 corresponding to the same electrode identifier. In another example, the two tags 29', 29" are configured to transmit the different signals to the antenna 154 corresponding to the same electrode identifier. The RFID tags will be referred to generally as RFID tag 29, or tag 29. A collection of RFID tags, each corresponding to a different electrode identifier, will be designated as 29a, 29b . . . 29n, for example 29a, 29b, and 29c for 3 tags corresponding to 3 different electrode identifiers.

As mentioned above, and referring again to FIG. 1, the antennas 154 are disposed at a location 156 for capturing signals from the RFID tags 29 which are attached to electrodes 11 in that location. In one or more examples, the location is the vicinity of an EAF. In other examples, the location 156 is in the vicinity of an electrode adding station. In another example the location is in the vicinity of a tilt table 158 where electrodes are moved from a horizontal orientation to a vertical orientation when being added to an electrode column. In other examples, the location is a vicinity within 1 to 100 feet from the EAF 10. In other examples the vicinity is within 1 to 50 feet of the EAF 10, and in still another example the vicinity is within 1 to 20 feet of the EAF.

The RFID tag reader 152 includes a processor 160 configured for receiving signals from the at least one antenna 154 and converting the signals to electrode identifiers. The RFID tag reader 152 also includes memory 162 for storing a set of the electrode identifiers corresponding to the electrodes 11a, 11b and 11c at a location 156, such as for example in the vicinity of the EAF 10. The reader 152 periodically reads the tags 29a, 29b, 29c attached to the electrodes 11a, 11b, 11c at the location 156 and populates the memory registers 162 with the electrodes' corresponding electrode identifiers.

The tag reader 152 is connected to the furnace monitor 102 by a connection 164, such as by an Ethernet connection. The furnace monitor processor 104 is configured for receiving the set of electrode identifiers stored in the tag reader memory 162, associating the electrode identifiers with the EAF data corresponding to the specific EAF 10 in which the electrode was used, and storing the association in the EAF monitor memory 106. Examples of the EAF data include the electrical data obtained by the electrical meter 110 described above, the process data obtained by the one or more PLCs described above, or combinations of both.

The furnace monitor processor 104 can be configured to use the association of the electrode identifier and EAF data described above to generate EAF data for specific electrodes and display this information on the local viewer system 118 during the operation of the EAF 10 to assist furnace operators and technicians during furnace operation.

The furnace monitor processor 104 can also be configured to process the EAF data for specific electrodes to generate current and past operating parameters of the electric arc furnace 10 for, or in relation to, specific electrodes including operating trends, historical trends, statistical tables and graphical representations, heat analysis reports, correlations and other analyses to better assist the viewer in evaluating the operation of the furnace 10. The processor 104 can be configured to generate reports and transmit the reports to the local viewer 118, the reports detailing the historical operation of the furnace in relation to specific electrodes using the association of the electrode identifier and EAF data described above. These reports include, for example, a single heat summary which includes the electrodes used in the heat, a daily heat summary which includes the electrodes used in all of the day's heats, daily shift heat summary and pertaining electrodes, weekly heat summary and pertaining electrodes, monthly heat summary and pertaining electrodes, heat summary by date range and conditions and pertaining electrodes, performance reporting in graphical format for pertaining electrodes, refractory wear reporting includes electrodes used, event log reporting pertaining to specific electrodes, specific electrode consumption reporting, and specific electrode usage and specific inventory reporting. These reports can now all be associated or correlated with specific electrodes by using the electrode identifiers described above.

Alternatively, or in addition to the local processing and displaying of the association of the electrode identifier and EAF data described above, the furnace monitor 102 can process portions of the EAF data and send the processed EAF data and unprocessed EAF data via the Internet 132 to the remote central server 130 disposed at a different location from the monitor 102 for storage in the database 133. The remote server 130 includes a processor 134 configured to use the association of the electrode identifier and EAF data described above and/or to make the association of the electrode identifier and EAF data described above to generate EAF data for specific electrodes, and/or indicate specific electrodes associated with particular EAF data, display this information on the remote viewer system 136 during the operation of the EAF 10 to assist furnace operators during furnace operation.

The server processor 134 can also be configured to process the EAF data for specific electrodes to allow a user to view current and past operating parameters of the electric arc furnace 10 for, or in relation to, specific electrodes including operating trends, historical trends, statistical tables and graphical representations, heat analysis reports, correlations and other analyses via the Internet portal 135 to better assist the viewer in evaluating the operation of the furnace 10. Authorized users may view reports via the portal detailing the historical operation of the furnace in relation to specific electrodes using the association of the electrode identifier and EAF data described above. These reports include, for example, a single heat summary, a daily heat summary, daily shift heat summary, weekly heat summary, monthly heat summary, heat summary by date range and conditions, performance reporting in graphical format, refractory wear reporting, event log reporting, electrode consumption reporting, and electrode usage and inventory reporting all for (i.e. in relation to) specific electrodes.

Other examples of the EAF data can include, but is not limited to, a time or time period, that the electrode was detected at the location 156, such as the EAF vicinity, and/or the time or time period that an electrode which was previously detected at the location 156 was no longer detected at that location. The furnace monitor processor 104 can be configured to receive this EAF data from the tag reader 152 by periodically reading the tag reader memory 162.

Determining the number of heats/add requires first knowing when an electrode is added to each electrode column and/or how many are added over the subject period of time. As discussed above, the determination that an electrode is added to one or more of the electrode columns is advantageously performed automatically.

A method of determining that an electrode is added to an electrode column includes: Monitoring RFID tags at a location within range of the antennas 154; receiving electrode identifiers from an RFID tag reader corresponding to the signals received from the RFID tags attached to electrodes disposed at the location 156; placing electrode identifiers in memory registers within the RFID reader no less than every N minutes, wherein 0.01<N<100; an electrode monitor reading the RFID reader memory and determining that an RFID identifier which was read previously is now no longer read from the memory thereby identifying that RFID identifier as a missing electrode identifier; associating the missing electrode identifier with an electrode column using electrode clamp data and/or electrode mast data.

With reference again to FIG. 1, the method for associating the missing electrode identifier with an electrode column using electrode clamp data and/or electrode mast data can include monitoring two operating parameters of the electric arc furnace 10. In one embodiment, the first monitored operating parameter is the movement of the electrode mast 50, by a column position transducer or a pressure transducer. Also the position of the clamp 52 can be monitored. The electrode column 12, 14, or 16 associated with the clamp 52 which moves after the missing electrode is detected is determined to be the column 12, 14, 16 receiving the missing electrode identified and determined to be the added electrode. The method can further include determining the electrical phase of the EAF associated with the electrode column which receives the added electrode and associating the electrode identifier with that electrical phase.

Thus, according to the above, a control signal may directly indicate the electrode column which receives the added electrode. The furnace monitor processor 104 is configured to associate the electrode identifier with the electrode column 12, 14, 16 and store this association in memory 106. This association can be transferred to remote server 130 for storage in database 133 and further processing by processor 134 to generate the current and past operating parameters and reports discussed above.

The operation of the electrode monitoring system 100 includes the tag reader capturing signals from the RFID tags attached to each of the graphite electrodes using one or more of the antennas which are disposed at a location 156, such as for example the vicinity of the EAF; the tag reader converting the signals into an electrode identifier specifically identifying the graphite electrode located at the location 156, and storing the electrode identifier in memory. The tag reader reads the electrode tags in this manner for each of the electrodes located at location 156 and stores the electrode identifiers as sets of identifiers in the reader's memory.

The electrode monitor controller periodically reads the tag reader memory to obtain the set of electrode identifiers and sends the set to the EAF monitoring server 130 via an internet connection. The EAF server processor 134 associates the electrode identifiers with specific furnace heats for which the electrodes were used for tracking the operation of the electrode while it is used in the EAF 10.

A method for monitoring the graphite electrodes for the electric arc furnace 10 generally comprises: capturing a signal from a tag, such as a radio frequency identification (RFID) tag, attached to a graphite electrode; converting the signal into an electrode identifier identifying the graphite electrode; transmitting the electrode identifier to an electric arc furnace monitor; receiving a set of electrode identifiers from an electrode tag reader at the monitor, the electrode identifiers obtained from signals from radio frequency identification (RFID) tags attached to graphite electrodes disposed near the location of the antenna, such as for example in the vicinity of the EAF; associating the electrode identifiers with EAF data corresponding to the specific electrodes; and storing the association in the EAF monitor memory.

The systems and methods of electrode identification described herein allow EAF operators and service personnel to determine which specific electrodes are used in each particular heat. Knowing the specific electrodes which are used in a heat enables operators and service personnel to correlate electrode performance with electrode batches thereby improving the performance of the graphite electrodes and/or EAF.

The furnace monitoring system 100 uses state of the art hardware and software to record the full range of operational parameters, including chemical ones, which make up the total operating environment of the electric arc furnace. The present invention provides on-line, real time access to the EAF data correlated to specific electrodes using the electrode identifiers detected and monitored as described herein.

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A method of monitoring electrodes comprising:
   receiving signals, by a tag reader, from a plurality of identification tags, wherein each tag is attached to a graphite electrode;
   processing the received signals to identify electrode identifiers, wherein each electrode identifier is associated with a graphite electrode;
   transmitting the electrode identifiers to a monitor; and
   associating the electrode or electrode identifier with one or more electric arc furnace (EAF) heats.

2. The method of claim 1 further comprising, at the monitor:
   receiving an electrode identifier from the tag reader;
   receiving EAF data relating to an EAF;
   associating the EAF data with the electrode; and
   storing the association in memory.

3. The method of claim 2 further comprising displaying the EAF data association on a viewer system.

4. The method of claim 2 further comprising:
   transmitting the EAF data association to a remote server; and
   storing the association in a memory of the remote server.

5. The method of claim 1 further comprising, at the monitor:
   receiving a plurality of electrode identifiers from the tag reader;
   associating the plurality of electrode identifiers with EAF data corresponding to each of the plurality of electrode identifiers; and
   storing the associations in memory.

6. The method of claim 1 further comprising:
   associating the electrode or electrode identifier with an electrode column.

7. The method of claim 1 further comprising:
   determining an electrode as being in a location using the electrode identifier.

8. The method of claim 7 further comprising determining the electrode as being in a vicinity of the EAF using the electrode identifier.

9. The method of claim 1 wherein the monitor is a computer control device.

10. The method of claim 1 wherein each tag is attached to at least one of a pin or a socket of the electrode, and wherein each electrode identifier identifies a specific and unique electrode.

11. The method of claim 1 further comprising, prior to the receiving step, accessing the graphite electrodes, wherein each graphite electrode has a tag mounted thereto.

12. The method of claim 11 wherein the tag is coupled to an axial end surface of at least one of a pin or a socket of the associated graphite electrode.

13. The method of claim 1 wherein each tag is attached to a threaded connector of the associated graphite electrode.

14. The method of claim 1 wherein the tag is attached to at least one of a pin or a socket of the associated graphite electrode.

15. The method of claim 1 wherein each tag is a Radio Frequency Identification (RFID) tag.

16. The method of claim 15 wherein each electrode has opposite first and second ends and further comprises a supplemental RFID tag, wherein each RFID tag is attached at or adjacent to the first end of the associated electrode and each supplemental RFID tag is attached at or adjacent to the second end of the associated electrode.

17. The method of claim 16 wherein the RFID tag and the supplemental RFID tag of each electrode are configured to transmit signals representing the same electrode identifier.

18. The method of claim 1 wherein each electrode identifier includes information relating to one or more of a location at which the electrode was machined, a line on which the electrode was machined, a weight of the electrode, a date the electrode was machined, a number identifying a specific electrode, batch identification information identifying a batch from which the graphite electrode was formed, or an EAF owner-specific number.

19. A method of monitoring electrodes comprising:
receiving signals, by a tag reader, from a plurality of identification tags, wherein each tag is attached to a graphite electrode;
processing the received signals to identify electrode identifiers, wherein each electrode identifier is associated with a graphite electrode;
transmitting the electrode identifiers to a monitor;
receiving a plurality of electrode identifiers from the tag reader;
associating the plurality of electrode identifiers with electric arc furnace (EAF) data corresponding to each of the plurality of electrode identifiers;
storing the associations in memory;
receiving information relating to past EAF operating parameters;
associating the past EAF operating parameters with specific electrodes;
receiving information relating to current EAF operating parameters;
associating the current EAF operating parameters with specific electrodes; and
displaying the associations on a viewer system.

20. The method of claim 19 further comprising:
generating reports detailing a historical operation of the EAF in relation to specific electrodes using the associations.

21. A method of monitoring electrodes comprising:
receiving signals, by a tag reader, from a plurality of identification tags, wherein each tag is attached to a graphite electrode;
processing the received signals to identify electrode identifiers, wherein each electrode identifier is associated with a graphite electrode;
transmitting the electrode identifiers to a monitor;
receiving a plurality of electrode identifiers from the tag reader;
associating the plurality of electrode identifiers with electric arc furnace (EAF) data corresponding to each of the plurality of electrode identifiers;
storing the associations in memory;
repeating the receiving the plurality of electrode identifiers, the associating the plurality of electrode identifiers with EAF data and the storing the associations in memory;
determining a missing electrode identifier to be an electrode identifier that was previously received but is not in a currently received set of electrode identifiers; and
identifying the missing electrode identifier as corresponding to an added electrode that has been added to an electrode column, the electrode column having a plurality of electrodes connected together.

22. The method of claim 21, wherein the determining further comprises:
determining the missing electrode identifier to be an electrode identifier which is in a set of stored electrode identifiers identified during a first time period and which is not in a set of stored electrode identifiers identified during a second time period, the second time period occurring after the first time period.

23. The method of claim 22 further comprising:
correlating the added graphite electrode or associated electrode identifier with a phase of an associated EAF.

24. The method of claim 23 wherein the correlating further comprises:
monitoring clamp positions of each of three electrode clamps in a 3 phase EAF, each electrode clamp corresponding to a respective electrode column associated with a corresponding electrical phase of the EAF;
determining a receiving clamp as an electrode clamp which changes position during the second time period; and
determining the electrode column receiving an added electrode as the electrode column associated with the receiving clamp.

25. The method of claim 21 wherein the repeating occurs every n minutes, wherein n is between 0.1 and 100.

26. A system for identifying graphite electrodes used in an electric arc furnace (EAF), the graphite electrodes each having an identification tag coupled thereto, the system comprising:
at least one antenna disposed in a vicinity of the EAF;
a tag reader operatively connected to the at least one antenna, the tag reader being configured for receiving signals from the at least one antenna and processing the received signals to identify a plurality of electrode identifiers, each electrode identifier being associated with a specific graphite electrode; and
a monitor operatively connected to the tag reader, the monitor being configured for receiving the electrode identifiers from the tag reader and associating the electrode identifiers with EAF data corresponding to specific electrodes, wherein the monitor is configured to receive a set of electrode identifiers, determine a missing electrode identifier as being an electrode identifier that was previously received but is not in a currently received set of electrode identifiers, identify the missing electrode identifier as corresponding to an added electrode, and associate the added electrode with an electrode column, the electrode column having a plurality of electrodes.

27. The system of claim 26 wherein the monitor is an EAF monitor operatively connected to the EAF for receiving EAF data, and wherein the system further includes the graphite electrodes.

28. The system of claim 26 wherein the monitor is configured to associate the electrode column having the added electrode with an EAF heat for which the electrode column was used.

29. The system of claim 26 wherein the monitor is configured to associate the added electrode with a position in the electrode column.

30. The system of claim 26 wherein the monitor is configured to determine whether the added electrode is positioned at an arc tip of the electrode column.

31. The system of claim 26 further comprising:
   a remote server operatively connected to the monitor for receiving the electrode identifiers and associated EAF data, the remote server having a memory for storing the electrode identifiers and associated EAF data and an Internet portal allowing authorized users to access the electrode identifiers and associated EAF data.

32. The system of claim 26 wherein the monitor is a computer control device.

33. The system of claim 26 further comprising at least one graphite electrode having a tag mounted thereto.

34. The system of claim 33 wherein the tag is coupled to an axial end surface of at least one of a pin or a socket of the graphite electrode.

* * * * *